United States Patent [19]

Fresch et al.

[11] Patent Number: 5,206,476
[45] Date of Patent: Apr. 27, 1993

[54] SUPPLEMENTARY AUTOMOBILE DUCT HEATER

[75] Inventors: John B. Fresch, Lockport; Thomas P. Warszawski, Niagara Falls, both of N.Y.

[73] Assignee: General Motors Corporation, Detroit, Mich.

[21] Appl. No.: 767,184

[22] Filed: Sep. 30, 1991

[51] Int. Cl.⁵ .......................... B60H 1/02; H05B 3/14; F24H 3/04
[52] U.S. Cl. .................................... 219/202; 219/505; 392/347; 392/360; 392/365; 392/385; 392/480; 392/485; 392/502
[58] Field of Search ................ 219/504, 505, 541, 553, 219/202; 392/360, 365, 347, 379–385, 480, 485, 502

[56] References Cited

U.S. PATENT DOCUMENTS

| | | |
|---|---|---|
| 3,440,398 | 4/1969 | Nilssen . |
| 3,459,924 | 8/1969 | McMichael .................. 392/480 |
| 3,582,968 | 6/1971 | Buiting et al. ................ 219/505 X |
| 3,619,560 | 11/1971 | Buiting et al. ................ 219/505 X |
| 3,927,300 | 12/1975 | Wada et al. ................... 392/485 X |
| 4,032,752 | 6/1977 | Ohmura et al. ............... 219/541 |
| 4,177,778 | 12/1979 | Naitou et al. ................. 392/502 X |
| 4,459,466 | 7/1984 | Nakagawa et al. . |
| 4,562,957 | 1/1986 | Nakagawa et al. ............ 219/202 X |
| 4,633,069 | 12/1986 | Berg et al. .................... 219/553 |
| 4,963,716 | 10/1990 | Van Den Elst et al. ....... 219/202 |

FOREIGN PATENT DOCUMENTS 243077 10/1987 European Pat. Off. ............ 392/365

Primary Examiner—Anthony Bartis
Attorney, Agent, or Firm—Patrick M. Griffin

[57] ABSTRACT

A supplementary passenger compartment heating assembly for use in conjunction with an automobile HVAC system having a forced air duct opening to the compartment includes a generally rectangular cross section air distribution duct molded integrally with the forced air duct from a heat conductive PTC polymer material. The air distribution duct has a pair of sides separated by a plurality of ribs extending therebetween so as to provide increased heat transfer area to the air forced therethrough.

1 Claim, 1 Drawing Sheet

SUPPLEMENTARY AUTOMOBILE DUCT HEATER

TECHNICAL FIELD

The invention relates to an automobile heater, and more particularly to a supplementary heater for generating heat during initial start-up period of the vehicle prior to heating by the HVAC system.

BACKGROUND OF THE INVENTION

Currently, vehicles use heat from the engine as transmitted from the engine cooling system to the heater core located in the HVAC air handling system to warm the passenger compartment and defrost the windows. Current HVAC systems have a delay time in the production of heat to the passenger compartment. Additional sources of heat are desirable to augment the current vehicle HVAC system.

In vehicles with automatic temperature control (ATC) systems, it is desirable to utilize a supplemental heat system that fills the time delay between vehicle start up and ATC on-time, which is usually one to three minutes and controlled by or is a function of coolant temperature.

There have been various methods proposed for heat augmentation or supplementation to the HVAC system. For example, a first type of heat augmentation is a fuel fired pre-heater. The separate vehicle heating system consists of a heat exchanger, electrical control system, engine coolant water pump, vehicle fuel burner, and a fuel supply line is utilized.

A second type of heat augmentation includes electric heaters utilizing electric heating elements or coils as disclosed in U.S. Pat. No. 3,440,398 issued Apr. 22, 1969, in the name of Nilssen.

A third type of heat augmentation is a positive temperature coefficient (PTC) ceramic heater in series with the vehicle HVAC system. This contains two separate ceramic heat exchangers placed downstream of the heater core within the HVAC air handling system and a separate electrical control system. Modification to the vehicle's electrical system is required in order to supply the power to the system. An example of the ceramic heater is disclosed in U.S. Pat. No. 4,459,466 issued Jul. 10, 1984 in the name of Nakagawa et al.

SUMMARY OF THE INVENTION

The invention is an auxiliary heating system for warming the passenger compartment and/or defrosting windows of an automobile having an air duct and vehicle electrical system, i.e., battery, in addition to the main heating system of a vehicle in the HVAC air handling system. The system comprises a supplementary heating means adapted to be connected in conjunction with or as the air duct. The supplementary heating means comprises electrically conductive polymer material for generating heat upon reception of electrical power from the vehicle electrical system to heat air communicated through the air duct.

Further features of the invention include terminals integral with and extending from the supplementary heating means adapted for connection to conductors of the vehicle electrical system. The supplementary heating may be comprised of molded electrically conductive plastic material.

BRIEF DESCRIPTION OF THE DRAWINGS

Advantages of the invention will be better understood by reference to the detailed drawings wherein.

DESCRIPTION OF THE PREFERRED EMBODIMENT

Figure 1:
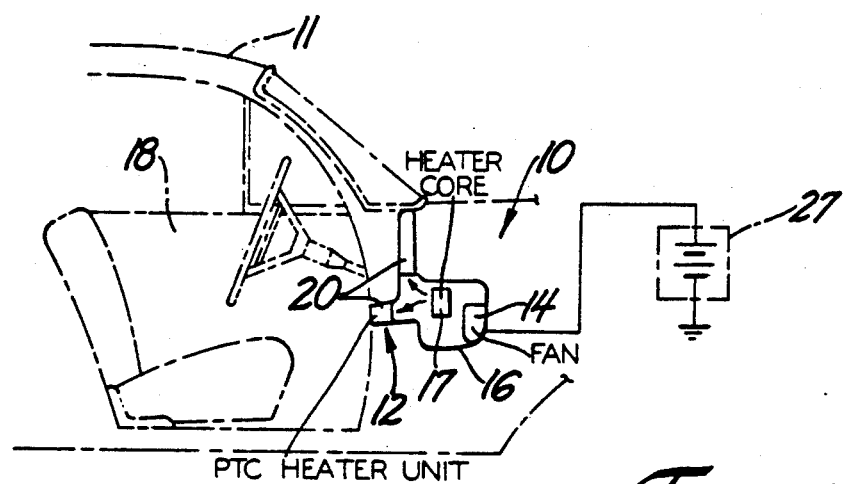
FIG. 1 is a diagrammatic view of a typical heating assembly incorporation the subject invention in an automotive vehicle.

An HVAC system of a vehicle 11 utilizing a supplementary heater unit 12 is generally shown at 10 in FIG. 1. The HVAC system 10 includes a radiator operatively connected to a liquid cooled engine (not shown). Duct work 16 for the system houses a conventional heater core 17 through which engine coolant circulates during vehicle operation. This duct work 16 communicates with the vehicle passenger compartment 18 for heating the compartment and/or defrosting through a vehicle air distribution duct 20. An electric fan 14 is positioned in the duct work 16 ahead of the heater core 17 to force air through the heater core and subsequently into the passenger compartment 18. A heating control circuit (not shown) is connected to the fan and conventional flow control valving in the duct work to control the temperature based on the selected position of a conventional temperature control in the passenger compartment 18. Heated air is forced into the passenger compartment 18 upon heating of the engine and flow of engine coolant through the heater core.

Figure 2:
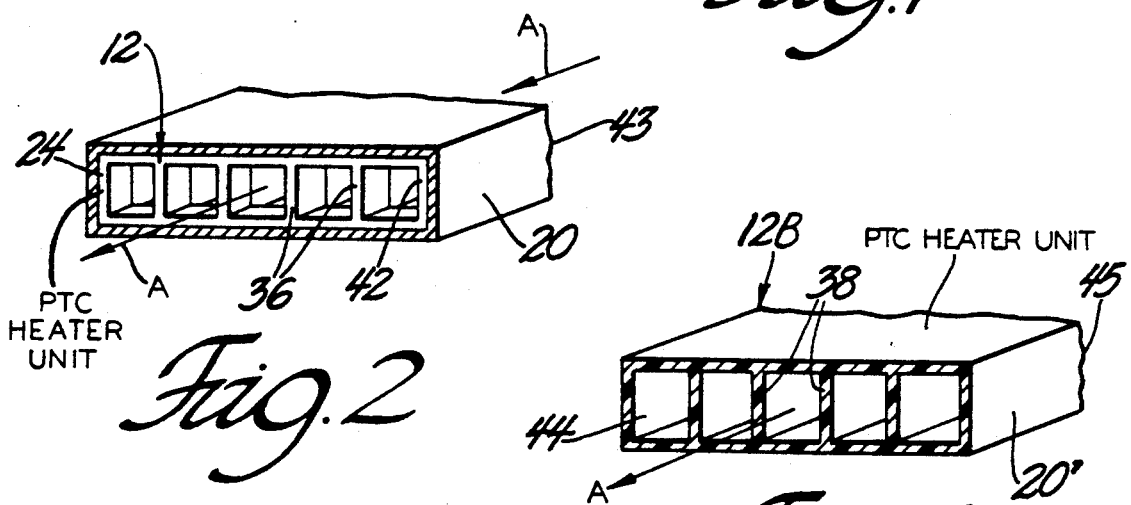
FIG. 2 is a pictorial view illustrating a first embodiment of the subject invention.
Figure 4:
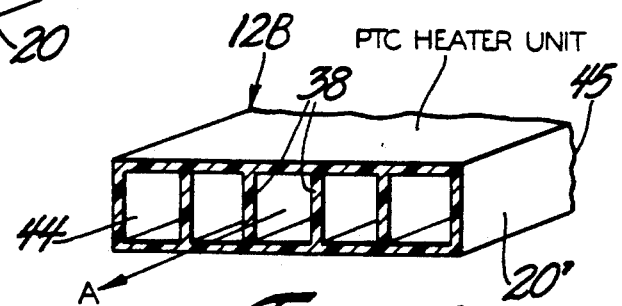
FIG. 4 is a pictorial view illustrating a third embodiment of the subject invention.
Figure 3:
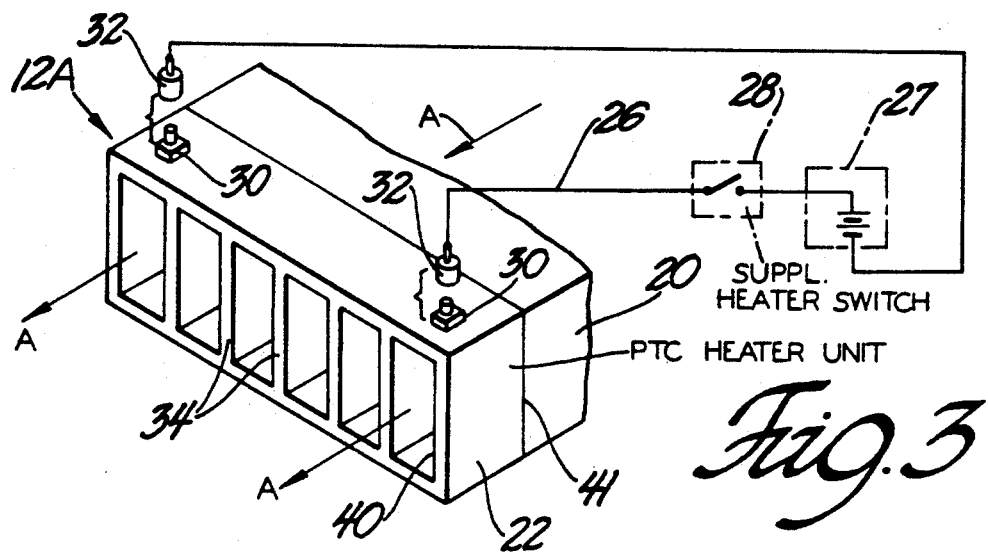
FIG. 3 is a pictorial view illustrating a second embodiment of the subject invention.

The supplementary heating unit 12 is adapted to be connected with, a part of, or as the air distribution duct 20 in order to provide initial and substantially immediate heat to the passenger compartment 18 upon initial operation and start-up of the vehicle 11. The supplementary heating unit 12 is made of electrically conductive polymer material, preferably a PTC (positive temperature coefficient) material, for generating heat upon reception of electrical power. The supplementary heating unit 12 comprises molded plastic or polymeric material, which may be molded as a separate insert piece 24 to the air duct 20 as illustrated in FIG. 2 by any of the plastic molding processes as commonly known in the art, i.e., injection molding, blow molding, etc. A second embodiment of the supplementary heating unit 12A may be molded as an extension 22 of the air distribution duct 20 as illustrated in FIG. 3. A third embodiment of the supplemental heating unit 12B may be molded as the entire air duct 20' as illustrated in FIG. 4. Each element 20', 22, 24 can be moldable to any shape with two open ends 40, 41, 42, 43, 44, 45 for allowing air to flow therethrough generally in the direction of the flow arrows A. A rectangular shaped element 20', 22, 24 is illustrated in the drawings as an example of one of many moldable shapes. Means 34, 36 38 are provided to increase the surface area for increasing heat transfer with the air passing therethrough, i.e., convoluted. The means 34, 36, 38 may comprise ribs extending between two sides of the element 20', 22, 24 providing a larger auxiliary heater area and resulting in increased heat transfer with the air passing therethrough.

For the insert 24 in FIG. 2, the external surface of the element 24 compliments the interior surface of the duct 20 so that the element 24 may be inserted into the duct 20 to communicate air through the element 24. For the extension element 22 in FIG. 3, it is molded as substantially the same shape as the air distribution duct 20 to further communicate air therethrough without any interruption. The internal surface of the extension element 22 is flush with the internal surface of the air distribution duct 20. For the air duct 22' in FIG. 4, it is molded as the shape required of the replaced air duct 20, but made of the electrically conductive material.

Electrical power is supplied to the molded conductive element 20', 22, 24 from the vehicle d.c. power supply 27 through wire conductor 26 to attain the proper temperature level of the air flow from the air duct 20. This connection is illustrated in FIG. 3, but applies to all elements 20', 22, 24. A prime advantage of this construction is to obtain immediate tempered air from the heater air distribution duct 20 during the initial engine/vehicle warm-up. More particularly, it does not replace the vehicle heater, but only supplements it during the approximate eight minutes of running at which time the system will cease operation and the vehicle heater system will function on its own. The fan 14 can be operated in the normal manner of the HVAC system to force air through the air duct 20. However, the air is also forced through the conductive element 20', 22, 24 thereby heating same during operation thereof. The combination of air duct 20 and conductive elements 20', 22, 24 communicates air from the heating chamber to the passenger compartment while heating same.

The assembly 10 includes control means 28 as best seen in FIG. 3 for terminating operation of the supplementary heating means 12 upon warming-up of the vehicle heater. The control means 28 may be comprised of a manual switch operated by the vehicle operator to turn on and off the supplementary heating unit 12, a discrete timing element which disconnects the supplementary heating unit from electrical power after a predetermined time upon starting of the vehicle and turning on of the main heater, i.e., eight minutes, or may include an automatic temperature control which disconnects power from the battery 27 upon temperature of the engine reaching a predetermined temperature.

The supplementary heating unit 12 includes molded terminals 30 (FIG. 3) integral with and extending therefrom adapted for connection with a connector 32 for connection with the vehicle electrical system 27. The electrical terminals 30 may be molded from the same material and in the same mold so that they are an integral part thereof. The location of the terminals 30 depends on whether concentration of the power in a certain area is desirable.

An auxiliary protection device may be required depending upon the material chosen. Some conductive polymeric materials provide their own innate protection. The polymer PTC material protects the heater system such that as the temperature reaches a certain point, the resistance raises which limits the current and therefore the power. The power and heating in the supplementary heating means 12 reaches an equilibrium which maintains the power level. As the material approaches its deformation temperature, the electrical circuit is broken.

Several electrically conductive polymer materials may be utilized having the requisite conductive plastic properties. One such material may be of the type of a PTC material which is a stainless steel filled with polycarbonate. The stainless steel fibers do not effect the base material's mechanical properties. Properties of this material include a volume resistivity in ohm-cm at 0 power to be 10 to the 0 power, deflection temperature at 66 psig is 295° F., water absorption in 24 hours is 0.12% and linear mold shrinkage of one eighth inch is 0.3%. Another material which maybe used is an aluminum flake filled ABS flame retardant.

The advantages to using an electrically conductive plastic material over ceramics is that plastics are much lighter than the equivalent options of metals and ceramics decreasing the weight requirements. Inserts may be placed in any air outlet location within the vehicle that would be effective. The material may be molded as either the original equipment duct or as an insert to the duct and molded into virtually any shape. These materials do not act as a heat sink and therefore do not retain heat and do not interfere with control head temperature linearity.

The invention has been described in an illustrative manner, and it is to be understood that the terminology which has been used is intended to be in the nature of words of description rather than limitation.

Obviously, many modifications and variations of the present invention are possible in light of the above teachings. It is therefore to be understood that within the scope of the appended claims the invention may be practiced otherwise than as specifically described.

What is claimed:

1. A supplementary passenger compartment heating assembly for an automobile having an electrical power source and a forced air duct opening to said compartment, comprising, a generally rectangular air distribution duct molded integrally with said forced air duct from a heat conductive PTC polymer material, said air distribution duct having a pair of sides separated by a plurality of ribs extending between said sides so as to provide increased heat transfer area to air forced therethrough, and, means selectively connecting said electrical power source to said air distribution duct, whereby air is both communicated to said compartment by said distribution duct and heated in supplementary fashion.

* * * * *